US010640055B1

(12) United States Patent  
Dellock et al.

(10) Patent No.: US 10,640,055 B1  
(45) Date of Patent: May 5, 2020

(54) ILLUMINATABLE VEHICLE ASSEMBLY AND VEHICLE ASSEMBLY ILLUMINATION METHOD

(71) Applicant: Ford Global Technologies, LLC, Dearborn, MI (US)

(72) Inventors: Paul Kenneth Dellock, Northville, MI (US); David Brian Glickman, Southfield, MI (US); Stuart C. Salter, White Lake, MI (US); Linda VanFleteren, Troy, MI (US); Harry Lobo, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/526,611

(22) Filed: Jul. 30, 2019

(51) Int. Cl.
| B60R 13/00 | (2006.01) |
| G09F 13/04 | (2006.01) |
| H01Q 1/32 | (2006.01) |

(52) U.S. Cl.  
CPC ........ B60R 13/005 (2013.01); G09F 13/0413 (2013.01); H01Q 1/3233 (2013.01); H01Q 1/3291 (2013.01); *G09F 2013/044* (2013.01)

(58) Field of Classification Search  
CPC ................................................ G09F 2013/044  
See application file for complete search history.

(56) References Cited

U.S. PATENT DOCUMENTS

| 5,958,573 | A | * | 9/1999 | Spitler ................... B82Y 20/00 |
|  |  |  |  | 257/103 |
| 9,035,547 | B2 | * | 5/2015 | Werners ............ B32B 17/10174 |
|  |  |  |  | 313/506 |
| 9,114,760 | B2 | * | 8/2015 | Mayer Pujadas ........ H01Q 1/38 |
| 10,011,215 | B2 | * | 7/2018 | Roberts ................. B60R 13/005 |
| 2005/0031897 | A1 | * | 2/2005 | Kamiya ............... H01Q 1/3233 |
|  |  |  |  | 428/689 |
| 2008/0079015 | A1 | * | 4/2008 | Krummacher ......... B82Y 30/00 |
|  |  |  |  | 257/98 |
| 2008/0157553 | A1 | * | 7/2008 | Embach .................... B32B 5/08 |
|  |  |  |  | 296/1.08 |
| 2015/0076851 | A1 |  | 3/2015 | Sugiura et al. |

FOREIGN PATENT DOCUMENTS

| DE | 10234125 | 2/2004 |
| DE | 102013016667 | 7/2014 |
| DE | 102017214129 | 2/2019 |
| EP | 3208134 A2 * | 8/2017 ............... B60Q 1/14 |
| JP | 2011093378 | 5/2011 |

* cited by examiner

*Primary Examiner* — Robert J May  
(74) *Attorney, Agent, or Firm* — David Coppiellie; Carlson, Gaskey & Olds, P.C.

(57) ABSTRACT

An illuminatable vehicle assembly includes, among other things, a substrate, and a multi-layered film atop the substrate. The multi-layered film has a dielectric layer that emits light. The dielectric layer is disposed between an anode layer and a cathode layer. The assembly further includes an overmold layer atop at least a portion of the multi-layered film.

18 Claims, 2 Drawing Sheets

ILLUMINATABLE VEHICLE ASSEMBLY AND VEHICLE ASSEMBLY ILLUMINATION METHOD

TECHNICAL FIELD

This disclosure relates generally to a decorative assembly for a vehicle. In particular, the disclosure relates to an assembly that can be selectively illuminated.

BACKGROUND

Vehicles can include many decorative assemblies. Some decorative assemblies, such as badges, help to identify a model of the vehicle.

SUMMARY

An illuminatable vehicle assembly according to an exemplary aspect of the present disclosure includes, among other things, a substrate, and a multi-layered film atop the substrate. The multi-layered film has a dielectric layer that emits light. The dielectric layer is disposed between an anode layer and a cathode layer. The assembly further includes an overmold layer atop at least a portion of the multi-layered film.

In another example of the foregoing assembly, the anode layer is an indium anode layer and the cathode layer is an indium cathode layer.

In another example of any of the foregoing assemblies, the dielectric layer comprises quantum dots suspended in a dielectric material.

In another example of any of the foregoing assemblies, the dielectric layer comprises a perovskite material suspended in a dielectric material.

Another example of any of the foregoing assemblies includes a radar module aft the substrate.

Another example of any of the foregoing assemblies includes a voltage regulating module that regulates power to the multi-layered film. The voltage regulating module is operably connected to the multi-layered film with at least two leads.

In another example of any of the foregoing assemblies, the overmold layer and the substrate are made of the same polymer or polymer-based material.

In another example of any of the foregoing assemblies, the overmold layer and the substrate are both poly(methyl methacrylate), both silicone, or both polycarbonate.

In another example of any of the foregoing assemblies, some portions of the multi-layered film are exposed and some portions are covered by the overmold layer.

In another example of any of the foregoing assemblies, the substrate, the multi-layered film, and the overmold layer later provide a vehicle badge.

A vehicle badge assembly, according to yet an exemplary aspect of the present disclosure includes, among other things, a vehicle grille, a radar module protruding through a portion of the vehicle grille, a substrate base layer extending over at least a portion of the vehicle grille and at least a portion of the radar module, a first indium layer atop the substrate, and a dielectric layer atop the first indium layer. The dielectric layer includes a plurality of perovskite quantum dots that illuminate when charged. A second indium layer is atop the dielectric layer. The first and second indium layers are configured to place a charge across the dielectric layer to illuminate the plurality of perovskite quantum dots. An overmold layer is atop at least a portion of the second indium layer film.

Another example of the foregoing assembly includes a voltage regulating module detached from both the vehicle grille and the substrate base layer. The voltage regulating module is operatively connected to the first and second indium layers with electrical leads.

In another example of any of the foregoing assemblies, the overmold layer and the substrate are made of a common polymer-based material.

An illumination method according to still another exemplary aspect of the present disclosure includes, among other things, electrically charging a multi-layered film of a badge to cause the multi-layered film of the badge to emit light, and communicating radar signals through the badge to and from a radar module.

Another example of the foregoing illumination method includes sandwiching at least a portion of the multi-layered film between a substrate and an overmold layer.

In another example of any of the foregoing illumination methods, a material composition of the substrate is the same as a material composition of the overmold layer.

In another example of any of the foregoing illumination methods, portions of the multi-layered film are not covered by the overmold layer.

In another example of any of the foregoing illumination methods, the multi-layered film comprises a perovskite material suspended in a dielectric material.

In another example of any of the foregoing illumination methods, the multi-layered film comprises quantum dots suspended in a dielectric material.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Generally, this disclosure relates to an illuminatable assembly, which is a type of decorative assembly. A dielectric layer of the illuminatable assembly can be energized to cause the dielectric layer to emit light. At least a portion of the dielectric layer can be sandwiched between an overmold layer and a substrate.

Figure 1:
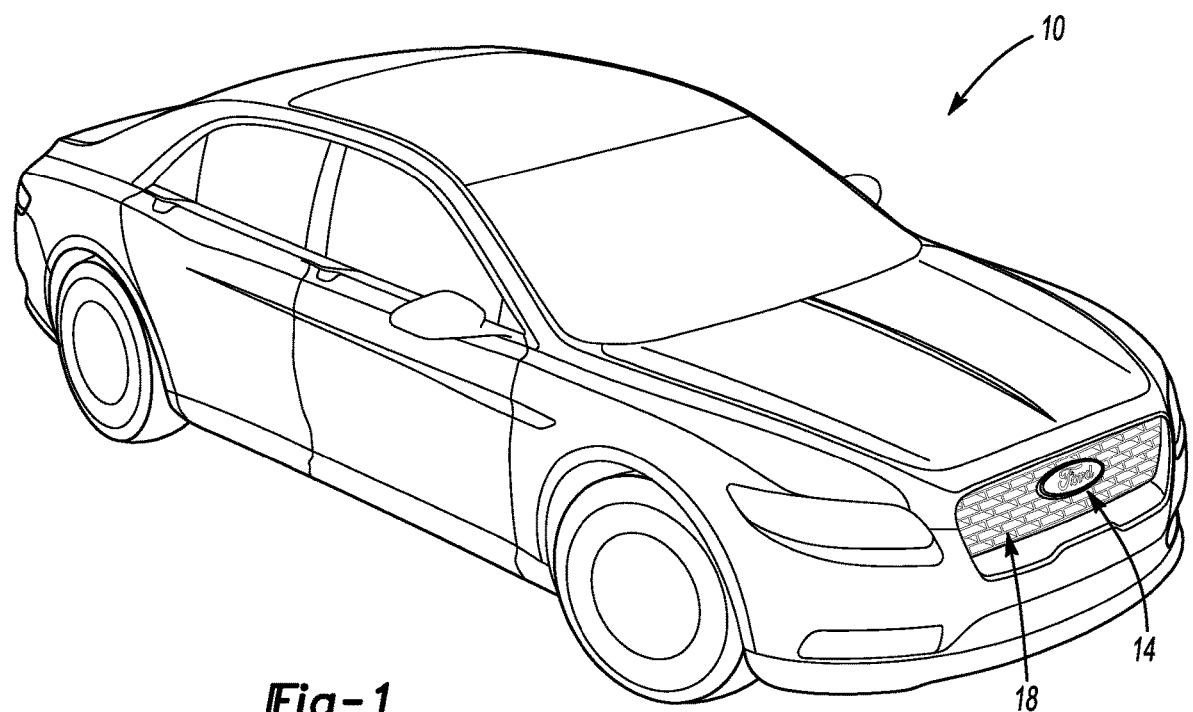
FIG. 1 illustrates a vehicle incorporating an illuminatable assembly according to an exemplary embodiment of the present disclosure.
Figure 2:
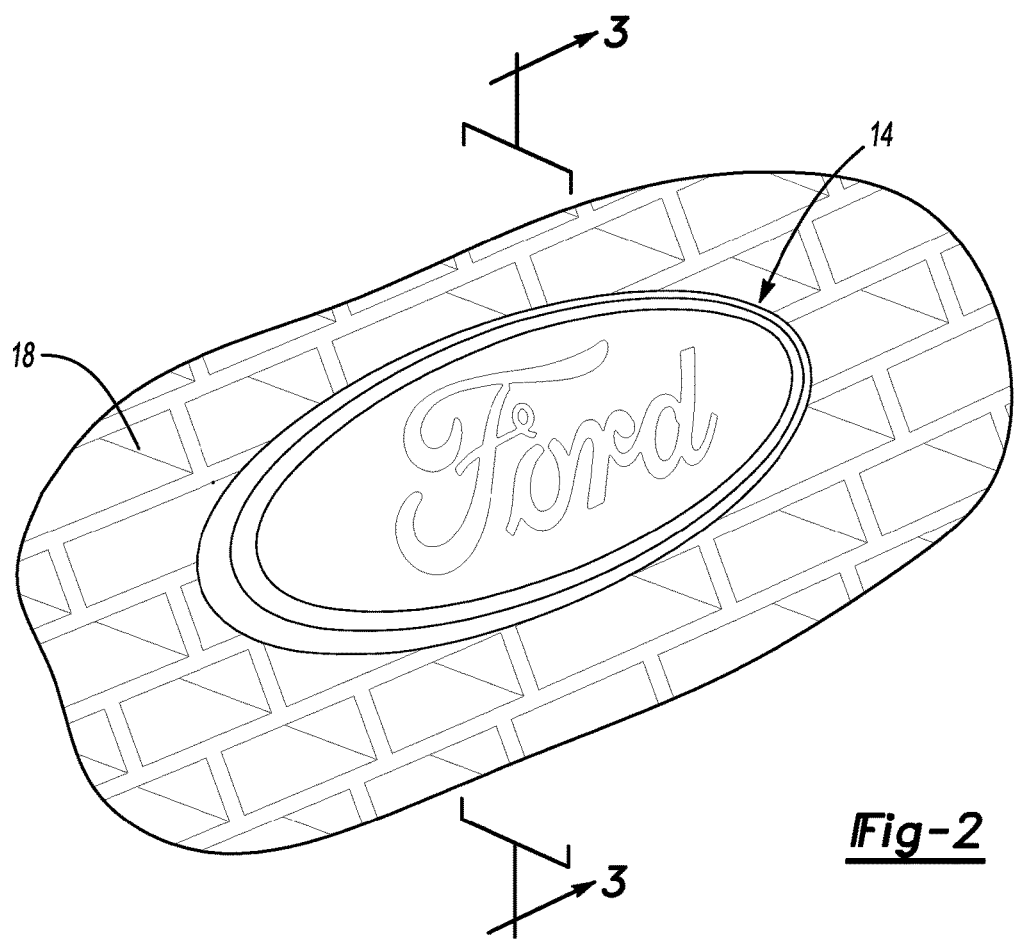
FIG. 2 shows a close-up front view of the illuminatable assembly of the vehicle of FIG. 1.

With reference to FIGS. 1 and 2, a vehicle 10 includes an illuminatable assembly 14. In this exemplary non-limiting embodiment, the illuminatable assembly 14 is a decorative badge that identifies the vehicle 10. Badges, in contrast to many trim components, can identify a brand of the vehicle 10. The badge can be a logo, a symbol, word, or some combination of these.

Although the exemplary illuminatable assembly 14 is a badge, the teachings of this disclosure can be applicable to illuminatable assemblies that are not badges, such as illuminatable trim components.

Further, although the exemplary illuminatable assembly 14 is positioned on an exterior front of the vehicle 10, the illuminatable assembly 14 could be located elsewhere on the vehicle 10, including areas on the exterior of the vehicle 10 other than the front end, in areas within an interior of the vehicle 10. Other areas of the vehicle 10 suitable for the illuminatable assembly can include, but are not limited to, a side panel of the vehicle 10, a deck lid of the vehicle 10, a scuff plate of the vehicle 10, a steering wheel of the vehicle 10, etc.

The example illuminatable assembly 14 can be selectively illuminated. When illuminated, a light, such as a white light, is emitted from portions of the illuminatable assembly 14. Notably, the exemplary illuminatable assembly is illuminated without utilizing light emitting diodes (LEDs).

In the exemplary embodiment, the illuminatable assembly 14 is mounted to a grille 18 of the vehicle 10. The grille 18 can provide a plurality of openings that permit air to flow into an engine compartment of the vehicle 10. The grille 18 can be molded from a polymer or polymer-based material. That material can be painted or chromed. A particular color could instead be molded in with the polymer or polymer-based material of the grille 18.

Figure 3:
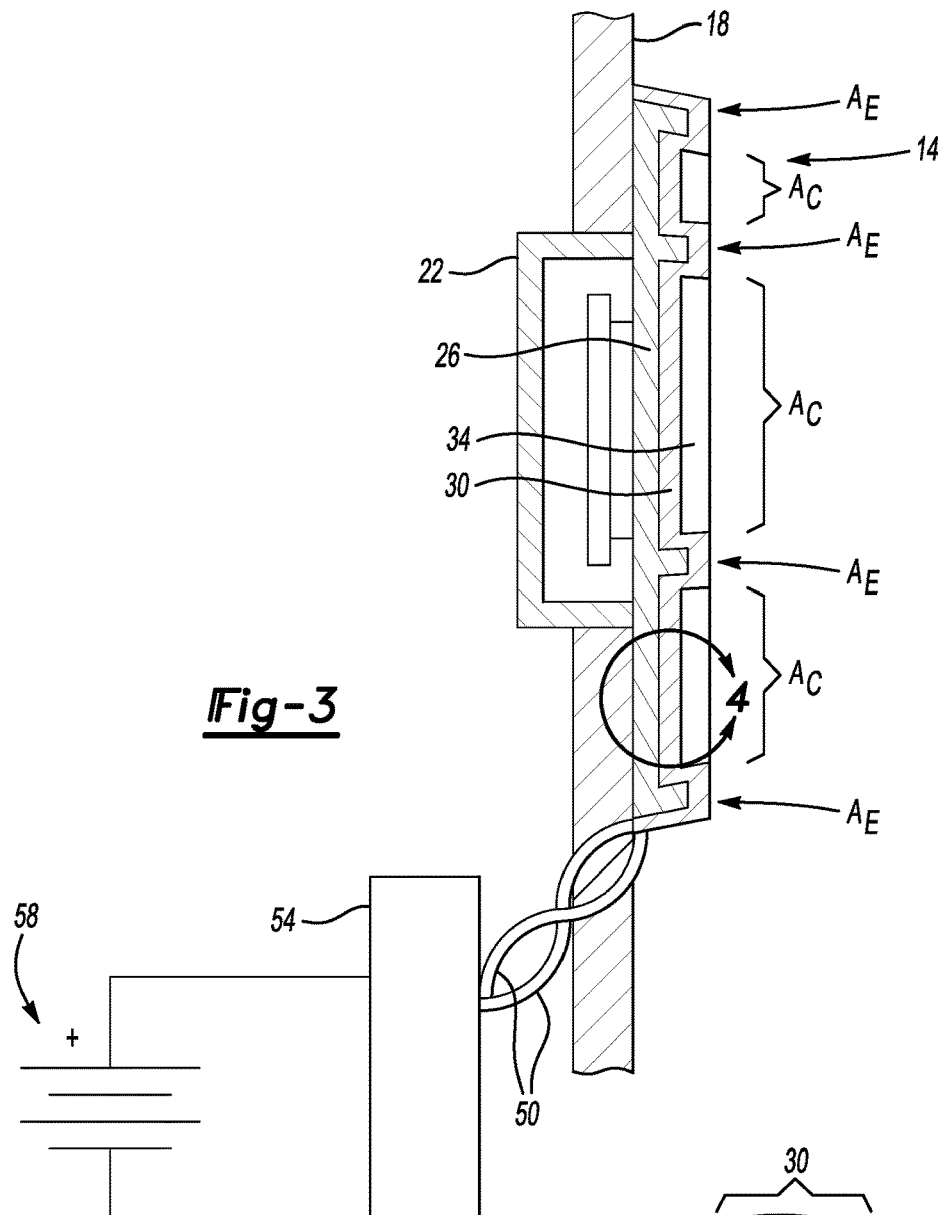
FIG. 3 illustrates a section view of the illuminatable assembly taken at line 3-3 in FIG. 2.

With reference to FIG. 3 and continuing reference to FIGS. 1 and 2, relative to an orientation of the vehicle 10, the illuminatable assembly 14 is disposed in front of portions of a radar module 22 of the vehicle 10. The radar module 22 is directly aft the illuminatable assembly 14 and protrudes through a portion of the grille 18. The illuminatable assembly 14 hides the radar module 22 from view when an observer is looking at a front of the vehicle 10.

Radar waves can move to and from the radar module 22. The illuminatable assembly 14 is, in the exemplary embodiment, constructed from materials that do not overly distort the radar waves. This permits the radar module 22 to be tucked behind a portion of the illuminatable assembly 14.

Figure 4:
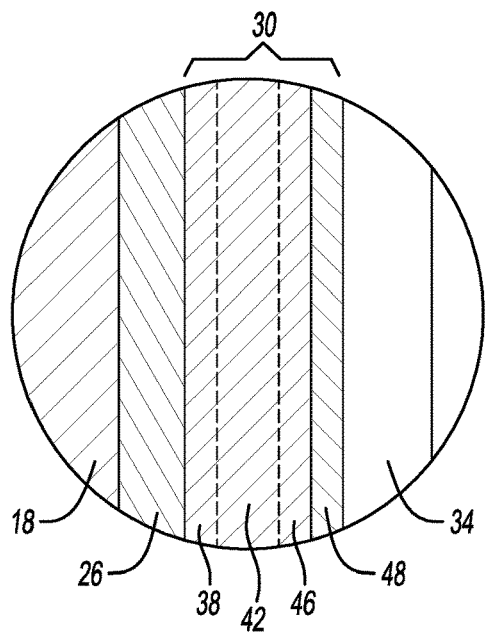
FIG. 4 illustrates a close-up view of a selected portion of FIG. 3.

With reference now to FIG. 4, the illuminatable assembly 14 includes multiple layers. In the exemplary embodiment, the illuminatable assembly 14 includes a substrate 26, a multi-layered film 30, and an overmold layer 34. The multi-layered film 30 includes a cathode layer 38, a dielectric layer 42, and an anode layer 46. The multi-layered film 30 can be illuminated.

The substrate 26 provides a base layer for the illuminatable assembly 14. The substrate 26 can be a polymer or polymer-based material. Atop the substrate 26 is the cathode layer 38. The dielectric layer 42 is sandwiched between the cathode layer 38 and the anode layer 46. As can be appreciated, the placement of the anode layer 46 and the cathode layer 38 could be reversed such that the anode layer 46 is positioned closer to the substrate 26 than the cathode layer 38.

Some areas Ac of the multi-layered film 30 are covered by the overmold layer 34 such that the overmold layer 34 is atop at least a portion of the multi-layered film 30. Other areas $A_E$ of the multi-layered film 30 are exposed through the overmold layer 34. When the multi-layered film 30 is illuminated, the areas Ac covered by the overmold layer 34 are perceived as being illuminated less than the areas $A_E$ that the areas $A_E$ that are exposed.

The outermost surfaces of the overmold layer 34 are nominally flush with an outermost surface of the multi-layered film 30 in the areas $A_E$. In some examples, the outermost surfaces of the overmold layer 34 and the outermost surface of the multi-layered film 30 could be covered with a protective clear film or another type of protective layer.

The overmold layer 34 and the substrate 26 can be made of the same polymer or the same polymer based material. That is, the overmold layer 34 and the substrate 26 can be made of a common polymer-based material.

In an example, the overmold layer 34 and the substrate 26 are both poly(methyl methacrylate). In other examples, the overmold layer 34 and the substrate 26 are both silicone, both polycarbonate, or both acrylic.

In the exemplary embodiment, the substrate 26 of the illuminatable assembly 14 extends over the portion of the vehicle grille 18 and the radar module 22.

In the exemplary embodiment, the cathode layer 38 and the anode layer 46 are thin film layers of sputtered indium. Also, the dielectric layer 42 includes a plurality of perovskite quantum dots that illuminate when charged.

Perovskite quantum dots are ionic nanocrystals that can illuminate light when charged. Many perovskite materials can emit visible light when charged or excited by ultraviolet light or electricity. The cathode layer 38 and the anode layer 46 can be used to excite/illuminate quantum dots or a perovskite material.

Perovskite quantum dots can be based on, for example, cadmium or lead. Such materials can emit intense colors across the entire visible range of colors. Some other perovskite quantum dots are based on tin, zinc, or indium.

An example formulation for the quantum dots is indium phosphide/Gallium phosphide/zinc sulfide (InP/GaP/ZnS) where InP provides the core, GaP provides an inner layer about the core, and ZnS provides the outer layer.

For the dielectric layer 42 of the illuminatable assembly 14, indium may be particularly appropriate since radar can substantially pass through indium metallic foils or films, as understood.

The multi-layered film 30, in the exemplary embodiment, further includes an appearance layer 48 facing outward away from the vehicle 10. The appearance layer 48 can be a layer of sputtered indium that provides a basic "chrome" appearance where the multi-layered film 30 is exposed through the overmold layer 34. The appearance layer 48 appears chrome-like when the dielectric layer 42 is not illuminated.

The appearance layer 48 can be made by sputtering a thin layer of indium to the backside of a plastic film. The metallic or chrome appearance can be provided by the layer of indium.

Electrical leads 50 extend from the cathode layer 38 and the anode layer 46 to a voltage regulating module 54, which regulates a voltage of power supplied by a battery 58, such as an accessory battery of the vehicle 10. The voltage regulating module 54 can be positioned remote from the illuminatable assembly 14. The voltage regulating module 54 can be secured to virtually any structural component surrounding the illuminatable assembly 14 including, for example, a front bumper, a front grille, or a radiator support.

The cathode layer 38 and the anode layer 46 can be selectively powered through the voltage regulating module 54, which electrically activates the cathode layer 38 and the anode layer 46 to charge the dielectric layer 42. Charging the dielectric layer 42 illuminates the plurality of perovskite quantum dots within the dielectric layer 42.

The light from the dielectric layer 42 can have a first color, which is green in this example. In some examples, a color conversion layer can be incorporated into the multi-layered film 30 to convert the first color into a second, different color. The color conversion layer could be positioned between the anode layer 46 and the appearance layer 48, for example. When the color conversion layer is used, the light of the first color passes from the dielectric layer 42 through the anode layer 46 outward to the color conversion layer.

The color conversion layer could comprise a rylene dye. As green light from the dielectric layer 42 moves through, for example, a film coated with red rylene dye, the green light is converted to a warm white light. If the film is instead coated with a purple rylene dye, the green light is converted to a cool white light.

The color conversion layer could instead comprise a red or purple phosphor florescent material to perform a "Stokes shift" on the green light and essentially shift the color from green to white. Stokes shifts can be performed by a molecule that can absorb a photon of shorter wavelength (higher frequency or energy) and emit a longer-wavelength photon.

When the color conversion layer is used and the illuminatable assembly is illuminated, the light of the second color is emitted through areas $A_E$ of the illuminatable assembly 14. Thus, when the illuminatable assembly is viewed from a position in front of the vehicle 10, portions of the illuminatable assembly 14 are illuminated in a white light.

When assembling the illuminatable assembly 14, the substrate 26 can molded against a first side of the multi-layered film 30. The overmold layer 34 can be overmolded against an opposite, second side of the multi-layered film 30.

For example, the multi-layered film 30 can be placed within a molding tool, with electrical leads 50 attached to the cathode layer 38 and the anode layer 46. The substrate 26 can then be back injected into a cavity of the molding tool against the multi-layered film 30. The substrate 26 can be molded via relatively low pressure molding to avoid damage to the multi-layered film 30.

In some examples, the multi-layered film 30 can be thermal formed and cut to precise shapes prior to molding the substrate 26 against the multi-layered film 30. The overmold layer 34 can then be molded against desired portions of the other side of the multi-layered film 30.

The illuminatable assembly 14 can then be secured to the grille 18 over the radar module 22. The illuminatable assembly 14 can be selectively powered through the leads 50, which electrically charges the multi-layered film 30 to cause the multi-layered film 30 to emit light. When not powered, the visible areas of the multi-layered film 30 can have a chrome appearance.

Radar signals can also be communicated through the illuminatable assembly 14 to and from the radar module 22. The overmold layer 34 and the substrate 26 can have a relatively consistent thickness, which can facilitate a substantially even pass through of radar waves.

Features of the disclosed examples include an illuminatable vehicle assembly that is compatible with radar, which means that radar waves can efficiently penetrate the assembly. The assembly can be illuminated without requiring LEDs and or a circuit board.

Although a specific component relationship is illustrated in the figures of this disclosure, the illustrations are not intended to limit this disclosure. In other words, the placement and orientation of the various components shown could vary within the scope of this disclosure. In addition, the various figures accompanying this disclosure are not necessarily to scale, and some features may be exaggerated or minimized to show certain details of a particular component.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. An illuminatable vehicle assembly, comprising:
   a substrate;
   an multi-layered film atop the substrate, the multi-layered film having a dielectric layer that emits light, the dielectric layer disposed between an anode layer and a cathode layer;
   an overmold layer atop at least a portion of the multi-layered film; and
   a radar module aft the substrate.

2. The illuminatable vehicle assembly of claim 1, wherein the anode layer is an indium anode layer and the cathode layer is an indium cathode layer.

3. The illuminatable vehicle assembly of claim 1, wherein the dielectric layer comprises quantum dots suspended in a dielectric material.

4. The illuminatable vehicle assembly of claim 1, wherein the dielectric layer comprises a perovskite material suspended in a dielectric material.

5. The illuminatable vehicle assembly of claim 1, further comprising a voltage regulating module that regulates power to the multi-layered film, the voltage regulating module is operably connected to the multi-layered film with at least two leads.

6. The illuminatable vehicle assembly of claim 1, wherein the overmold layer and the substrate are made of the same polymer or polymer-based material.

7. The illuminatable vehicle assembly of claim 1, wherein the overmold layer and the substrate are both poly(methyl methacrylate), both silicone, or both polycarbonate.

8. The illuminatable vehicle assembly of claim 1, wherein some portions of the multi-layered film are exposed and some portions are covered by the overmold layer.

9. The illuminatable vehicle assembly of claim 1, wherein the substrate, the multi-layered film, and the overmold layer later provide a vehicle badge.

10. The illuminatable vehicle assembly of claim 1, wherein the overmold layer and the substrate are made of a common polymer-based material.

11. A vehicle badge assembly, comprising:
    a vehicle grille;
    a radar module protruding through a portion of the vehicle grille;
    a substrate base layer extending over at least a portion of the vehicle grille and at least a portion of the radar module;
    a first indium layer atop the substrate;
    a dielectric layer atop the first indium layer, the dielectric layer including a plurality of perovskite quantum dots that illuminate when charged;
    a second indium layer atop the dielectric layer, the first and second indium layers configured to place a charge across the dielectric layer to illuminate the plurality of perovskite quantum dots; and an overmold layer atop at least a portion of the second indium layer film.

12. The vehicle badge assembly of claim 11, further comprising a voltage regulating module detached from both the vehicle grille and the substrate base layer, the voltage regulating module operatively connected to the first and second indium layers with electrical leads.

13. An illumination method, comprising:

electrically charging an multi-layered film of a badge to cause the multi-layered film of the badge to emit light; and communicating radar signals through the badge to and from a radar module.

14. The illumination method of claim 13, further comprising sandwiching at least a portion of the multi-layered film between a substrate and an overmold layer.

15. The illumination method of claim 14, wherein a material composition of the substrate is the same as a material composition of the overmold layer.

16. The illumination method of claim 14, wherein portions of the multi-layered film are not covered by the overmold layer.

17. The illumination method of claim 14, wherein the multi-layered film comprises a perovskite material suspended in a dielectric material.

18. The illumination method of claim 14, wherein the multi-layered film comprises quantum dots suspended in a dielectric material.

* * * * *